Figure 1:
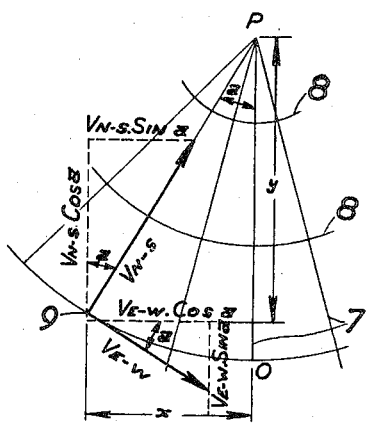

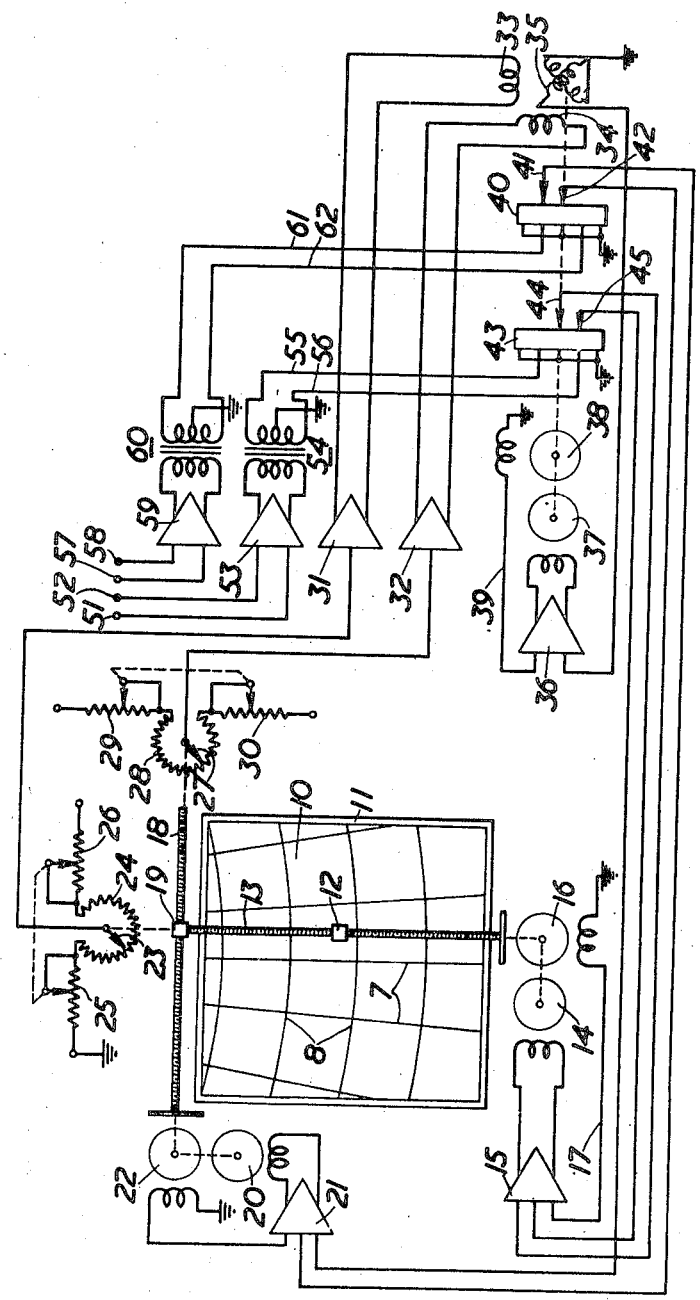

INVENTORS
Albert Ernest Cutler
Thomas Brian Murray
BY George H. Corey
ATTORNEY

United States Patent Office 2,829,446
Patented Apr. 8, 1958

2,829,446

APPARATUS FOR INSTRUCTION OR TRAINING IN NAVIGATION

Albert E. Cutler, Wimbledon, London, and Thomas B. Murray, Upper Norwood, London, England, assignors to Communications Patents Limited, London, England Application October 6, 1953, Serial No. 384,434

Claims priority, application Great Britain October 27, 1952

11 Claims. (Cl. 35—10.2)

This invention is concerned with apparatus, for instruction or training in navigation, of the kind incorporating means for indicating or recording the "movement" of a simulation craft which is being controlled by a pupil or pupils. Apparatus of this kind enables highly satisfactory instruction or training to be given to one or more pupils, without necessitating the use of real craft, and constitutes a valuable contribution to the art of navigation.

The invention is particularly applicable to that type of such apparatus adapted for instruction or training in aerial navigation and involving means for indicating or recording the ground path "flown" by a simulation aircraft.

A basic element of such apparatus is a chart, for the use of an instructor, of the earth's surface over which the synthetic movement is made and although, in many cases, charts having rectangular co-ordinates have been used for this purpose, these are, in general, quite unsuitable to represent a large area of the earth's surface unless considerable inaccuracy can be tolerated. In this respect it seems that charts which provide a substantially constant scale are highly desirable for this purpose and, in particular, such charts in which the meridians are represented by converging straight lines whilst the parallels are represented by arcs of circles which are centred at a common point of intersection of said straight lines. Several known forms of map projection satisfy this requirement. For example, there is the simple conical with one standard parallel, conical with two standard parallels and secant conic. The invention also seems to be applicable to any of the polar zenithal projections such as the polar zenithal equal area, equidistant or stereographic projections, these being in reality conic projections in which the constant of the cone is made equal to unity. It can also be applied to a straight meridian polyconic projection, such as the polyconic international (one-in-a-million) projection, in cases where the centres of the arcs representing the parallels in the chart in use are sufficiently close to enable the error, introduced by the assumption that the arcs are concentric, to be ignored. Conveniently and for the purpose of this specification, charts based upon such forms of projection will hereinafter be referred to as straight meridian conic charts.

In the case of the simple conical projection, distances along the standard parallel are accurate but distances along other parallels become more inaccurate as the distance from the standard parallel increases. In those forms of projection involving two standard parallels the distances along two parallels are accurate, the distance along intermediate parallels are a little too short and the distance along parallels which are outside the two standard parallels are a little to long; nevertheless serious erros are not necessarily introduced by assuming the scale to be constant.

When straight meridian conic charts are used, a great circle course can be indicated by a straight line without appreciable error. This is an advantage when radio bearings are involved but unfortunately this type of chart has the disadvantage that a rhumb line course cannot be represented by a straight line since such a line would have different angular relationship with every meridian. Neverthless, the use of straight meridian conic charts is considered desirable for the use of instructors and accordingly it is amongst the objects of the present invention to provide novel apparatus for instruction or training in navigation whereby corrections are introduced automatically to enable such charts to be used more satisfactorily.

In the specification of co-pending application No. 308,762, now Patent No. 2,796,681, of September 10, 1952, there is described an apparatus for use with a straight meridian conic chart and this apparatus incorporates means operating automatically to apply to a magnetic compass system corrections such that, when the simulation craft moves on a magnetic compass course determined by said system, the indicating or recording element moves so as to cut the meridians of the chart at substantially constant angles. With this apparatus, in order for a pupil to maintain a constant magnetic compass course, the pupil adjusts the steering of the craft in response to the corrections automatically applied to the compass and, as a result, the indicating or recording element traces on the chart a curved track representing a constant compass course.

The principal object of the present invention is to provide novel apparatus which eliminates the need for such action by the pupil, this apparatus being distinguished broadly from that aforesaid, by virtue of the fact that the appropriate corrections are made to the movement of the indicating or recording element instead of being applied to a magnetic compass system.

According to one aspect of the invention, an apparatus for instruction or training in navigation of the kind set forth and pertaining to the use of a straight meridian conic chart, comprises a movable indicating or recording element, means serving to obtain relative movement of said element and such a chart as a function of the synthetic movement of the simulation craft, and means operating automatically when the said craft moves on a magnetic compass course to cause said element to cut the meridians of the chart at substantially constant angles.

According to another aspect of the invention, an apparatus for instruction or training in navigation of the kind set forth and pertaining to the use of a straight meridian conic chart, comprises a movable indicating or recording element, means serving to obtain relative movement of said element and such a chart as a function of the synthetic movement of the simulation craft, and means serving to modify the operation of said element-moving means to cause the indicating or recording element to cut the meridians of the chart at substantially constant angles when the simulation craft moves on a magnetic compass course.

According to a further aspect of the invention an apparatus for instruction or training in navigation of the kind set forth and pertaining to the use of a straight meridian conic chart, comprises a movable indicating or recording element, means serving to obtain movement of said element with respect to such a chart in two normal directions as a function of the synthetic movement of the simulation craft, a magnetic compass system which serves to indicate to a pupil the heading of the said craft, and means serving to modify the operation of the said element-moving means as a function of the variation of the angle made by the meridian passing through the assumed position of the simulation craft with a reference axis which passes through the pole point on which the projection is based, so that the movement of the indicating or recording element on the chart is always in substantial agreement with the heading of the craft as indicated by said magnetic compass system.

In preferred embodiments of the invention means are provided for obtaining electrical quantities which are representative of the assumed position of the simulation craft and the appropriate corrections to be made to the movement of the indicating or recording element and these electrical quantities, for example electrical potential differences, are employed to control the effect of electro-mechanical arrangements whereby the desired movement of the indicating or recording element is obtained.

Thus in accordance with a still further aspect of the invention, apparatus for instruction or training in navigation of the kind set forth and pertaining to the use of a straight meridian conic chart, comprises a movable indicating or recording element, means operative in response to the application thereto of appropriate electric signals to obtain relative movement of said element and such a chart in two normal directions as a function of the synthetic movement of the simulation craft, means serving to compute the horizontal and vertical co-ordinates of the said element with respect to rectangular axes parallel to the two normal directions of movement of the said element and having as origin the pole point on which the projection is based, computing means serving to determine the velocity of the simulation craft in the vertical and horizontal directions of the chart as functions of the said rectangular co-ordinates and of the north-south and east-west velocities of the said craft, means serving to obtain electric signals which are representative of the said horizontal and vertical velocities and means serving to apply said signals to the said signal-responsive means whereby the said element is moved to cut the meridians of the chart at substantially constant angles when the craft moves on a magnetic compass course.

In preferred embodiments of the invention, means are provided for obtaining quantities, which may be for example electric potential differences or shaft rotations, which in combination are representative of the position of the indicating or recording element with respect to the chart, and means whereby these quantities are employed to control the effect of electro-mechanical arrangements, whereby appropriate corrections are introduced into the movements of the indicating or recording element.

Figure 3:
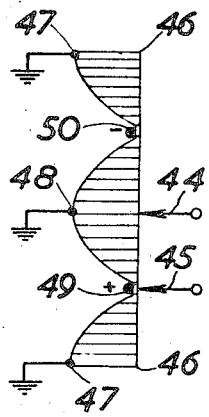
Figure 5:
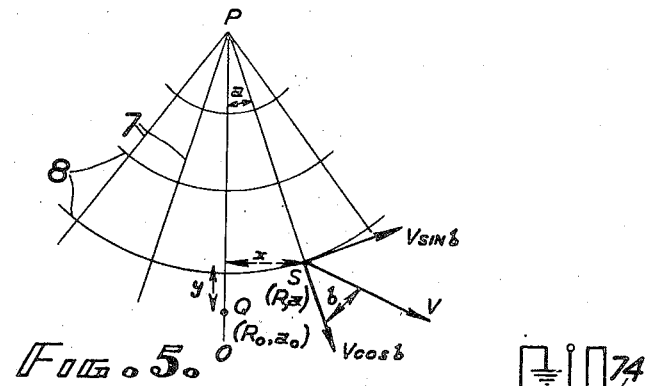
Figure 6:
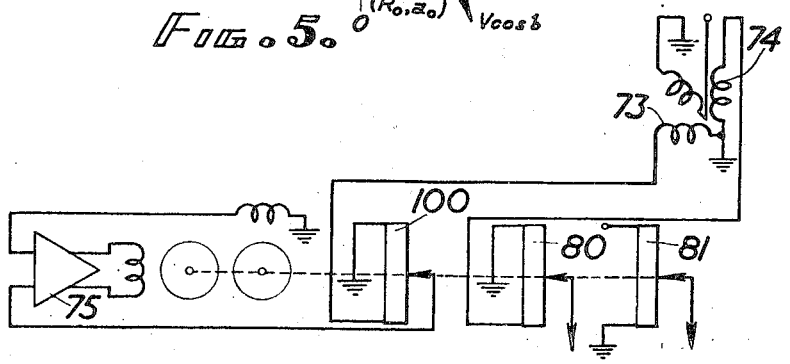
Figure 4:
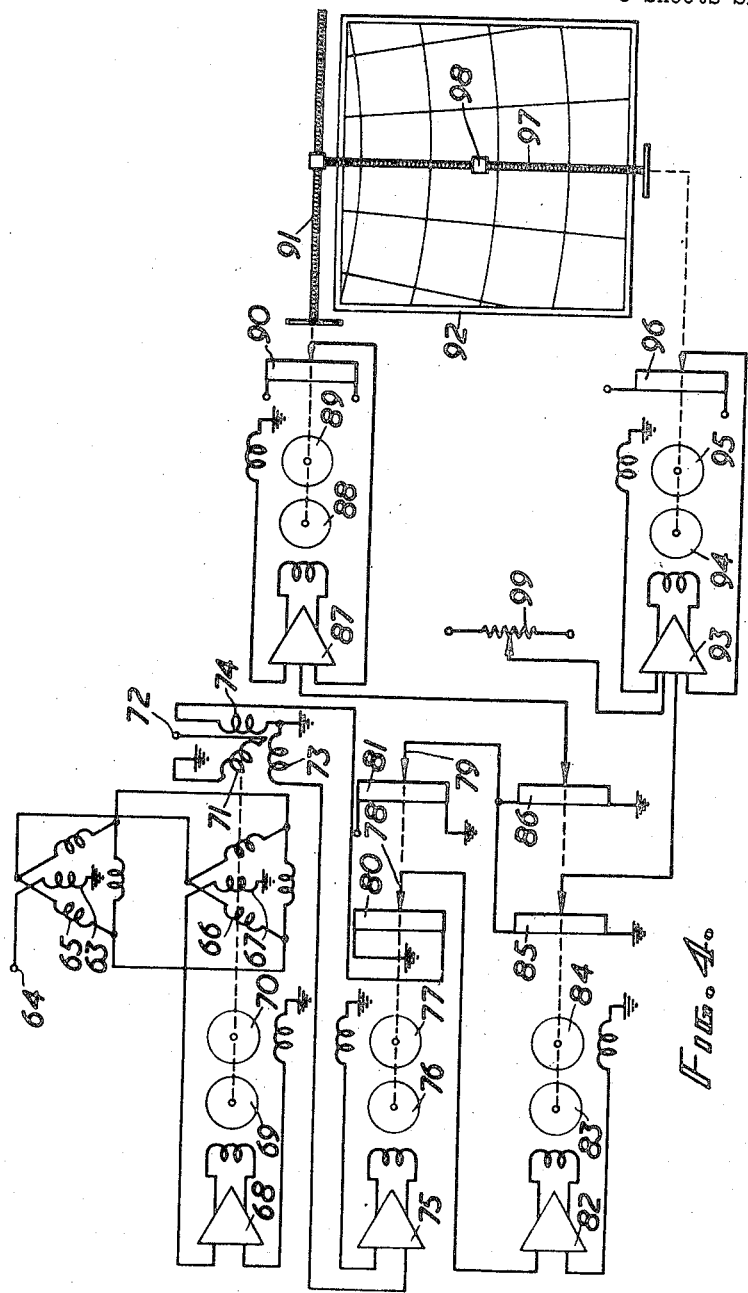

Two embodiments of the invention which pertain to flight navigational trainers will now be described, by way of example only, with reference to the accompanying drawings wherein:

Fig. 1 is a diagram for explaining the apparatus employed in the first embodiment, Fig. 2 shows diagrammatically the apparatus according to the first embodiment, Fig. 3 shows the form of a sine-cosine potentiometer of the kind used in the apparatus of Fig. 2, Fig. 4 shows diagrammatically the apparatus according to the second embodiment, Fig. 5 is a diagram illustrating the operation of the apparatus of Fig. 4, and Fig. 6 shows a modification of the apparatus of Fig. 4, for use with polar charts.

In Fig. 1, the meridians of a straight meridian conic chart are represented by the lines 7 converging to a point P, which is the pole-point on which the chart projection is based, and the parallels of latitude are represented by the concentric arcs 8 having the point P as centre. A point 9 represents the assumed position of the simulation "aircraft" and the marking point of a recording pen which is movable on the chart in two normal directions, parallel to the meridian OP and at right-angles to the latter. The ground speed of the "aircraft" is represented by the north-south and east-west velocity vectors $V_{N-S}$ and $V_{E-W}$ and if the angle made by the meridian passing through the point 9 with the meridian OP is $a$, it will be seen that the total component of velocity of the "aircraft" in a direction parallel to the meridian OP is $V_{N-S} \cos a - V_{E-W} \sin a$, and that the total component of the velocity of the "aircraft" in the direction perpendicular to the meridian OP is $V_{N-S} \sin a + V_{E-W} \cos a$.

The apparatus shown in Fig. 2 is adapted to compute these velocity components and to move a recording pen over a chart in accordance with the results obtained. This chart, indicated at 10, is based on a straight meridian conic projection and is placed in a rectangular frame 11. The meridians and parallels are indicated by the lines 7 and 8 respectively, as in Fig. 1, and the central meridian is parallel to the vertical sides of the frame. A recording pen 12 is mounted on a vertical (north-south) lead-screw 13 so as to be displaced along the lead-screw when the latter is rotated by an electric motor 14, which is energised by the output from an amplifier 15. This motor 14 also drives a generator 16 which supplies a velocity feedback signal to the amplifier 15, over conductor 17, to ensure that the angular velocity of the motor is always proportional to the voltage input and to eliminate hunting. The vertical lead-screw 13 is mounted on a horizontal (east-west) lead-screw 18 by means of a bearing block 19, so that when, as a result of rotation of the lead-screw 18 by an electric motor 20, the block 19 is displaced along the horizontal lead-screw the vertical lead-screw assembly is displaced laterally across the chart. The motor 20 is energised by the output from an amplifier 21 and drives a generator 22 which provides a velocity feedback signal for this amplifier.

The manner in which the input signals for the amplifiers 15 and 21 are obtained will now be described.

The vertical lead-screw 13 is coupled mechanically to the wiper 23 of a potentiometer 24 which is arranged between and in series with two manually-adjustable potentiometers 25 and 26. An alternating potential difference having a maximum amplitude of 600 v. is established between the outer end of the potentiometer 26 and the outer earthed end of the potentiometer 23. The wiper of the potentiometer 25 is connected to the junction of this potentiometer with the potentiometer 24 and the wiper of the potentiometer 26 is connected to the junction of this potentiometer 26 with the potentiometer 24. In addition the wipers of these potentiometers 25 and 26 are ganged in such a manner that, whatever their adjustment, the combined series resistance is always constant. Accordingly, the maximum potential difference across the ends of the potentiometer 24 is maintained at a constant value of 100 v. but the voltage output from the wiper 23 is made dependent on both the position of this wiper itself, in that this voltage output is a maximum when the pen 12 is at the botom (south) of the chart and a minimum when the said pen is at the top (north) of the chart, and the positions of the ganged wipers of the potentiometers 25 and 26. The latter are set according to the relationship between the vertical length of the chart in use and the perpendicular distance between the top or bottom of the chart and the pole-point on which the projection is based, thus enabling charts of different regions and of different scale to be used at will. For example, assuming that the top of the chart in use is four chart-lengths distance from the pole-point the ganged wipers of the potentiometers 25 and 26 are adjusted until the maximum potential at the junction of the potentiometers 25 and 24 is 400 v. and the maximum potential at the junction of the potentiometers 26 and 24 is 500 v. It will be apparent therefore that the voltage output from the wiper 23 of this vertical potentiometer system represents the vertical distance, from the pole-point, of a perpendicular drawn from the recording pen to the central meridian.

The horizontal lead-screw 18 is coupled mechanically to the wiper 27 of a potentiometer 28 which is arranged between and in series with two manually-adjustable potentiometers 29 and 30. The wiper of the potentiometer 29 is connected to the junction of this potentiometer with the potentiometer 28 and the wiper of the potentiometer 30 is connected to the junction of this potentiometer 30 with said potentiometer 28, these two wipers being ganged in such manner that whatever their adjustment, the combined series resistance is always constant. The outer ends of the potentiometers 29 and 30 are given equal but anti-phase alternating voltages having a maximum amplitude of 100 v. with respect to earth and the resistance of these potentiometers 29 and 30 is so chosen that the maximum voltage maintained across the ends of the potentiometer 28 is 100 v. The position of the point of zero potential on the potentiometer 28 is determined by the setting of the ganged wipers of the potentiometers 29 and 30 and this setting is made according to the position of the vertical meridian, that is to say that meridian which is parallel to the side of the frame. If the vertical meridian is centrally disposed within the chart frame, as shown in the drawing, the ganged wipers of the potentiometers 24 and 30 will be set so that the anti-phase alternating potentials applied to the opposite ends of the potentiometer 28 will have maximum amplitudes of 50 v. In cases where the vertical meridian of the chart is located alongside an edge of the frame, the ganged wipers of the potentiometers 29 and 30 would have to be set so that one end of the potentiometer 28 had zero potential applied thereto whilst the other end of said potentiometer 28 had the maximum of 100 v. A. C. applied thereto. It will be seen that the voltage output of the wiper 27 of this horizontal potentiometer system represents the perpendicular distance of the recording pen 12 from the vertical meridian of the chart.

If it can always be arranged that the vertical meridian of the chart will be centrally disposed within the chart frame, the potentiometers 29 and 30 may be omitted. In this case the ends of the potentiometer 28 are then given equal anti-phase alternating potentials having a maximum amplitude of 50 v. and this potentiometer is preferably provided with a centre tapping point which is connected to earth.

The signals obtained by the wipers 23 and 27 of these vertical and horizontal potentiometer systems are applied to amplifiers 31 and 32, respectively, and the amplified signals are used to energise field coils 33 and 34, respectively, of a sine-cosine resolver which also comprises a rotor winding 35. The latter is adapted to provide an input signal for an amplifier 36 of a follow-up servo-system. This servo-system comprises an electric motor 37 which is energised by the output from the amplifier 36 and is coupled mechanically to the said rotor 35 of the resolver, this arrangement being such that the motor 37 drives the said rotor 35 until there is no output from the latter, that is to say until the rotor 35 reaches a position at right-angles to the resultant field produced by the two field coils 33 and 34. A generator 38 is driven by the motor 37 and provides a velocity feedback signal, over a conductor 39, for the amplifier 36.

A contoured drum-type potentiometer 40 has two wipers, 41 and 42, which are maintained at a constant angular spacing of 90° and are adapted to be rotated by the shaft of the motor 37. A further and correspondingly contoured drum-type potentiometer 43 is provided and has two wipers, 44 and 45, which are maintained at a constant angular spacing of 90° and are also adapted to be rotated by the shaft of the said motor. The contour of the winding of these two potentiometers is illustrated diagrammatically in Fig. 3 which shows, by way of example, the winding of the potentiometer 43 opened out so as to lie in one plane (the ends 46 being normally joined together). This winding is such that, when it is earthed at two diametrically opposite points 47 and 47 and is provided with A. C. input signals of equal amplitude but opposite phase at the two intermediate diametrically opposite points 49 and 50, the wipers 44 and 45 provide output signals having maximum voltages proportional to the sine and cosine of the angle of rotation of the wipers from a reference position. The angular rotation of the wipers 44 and 45 is determined by the amplitude of the signals applied to the field coils 33 and 34 of the resolver, and the output signals from said wipers 44 and 45 are also proportional to the amplitude of the anti-phase input signals applied to the potentiometer winding at points 49 and 50.

The potentiometer 40 is adapted to operate in the same manner but its wipers 41 and 42 lag 90° with respect to the wipers 44 and 45 of the potentiometer 43. This lag corresponds to the 90° angular spacing of the vertical and horizontal reference axis and is necessary in order to take into account the sign, whether positive or negative, of the velocity components.

The derivation of the input signals for the potentiometers 40 and 43, which pertain to the vertical component of velocity and the horizontal component of velocity respectively, will now be described.

Alternating voltages having maximum amplitudes proportional to the east-west air speed of the simulation aircraft and the east-west wind velocity are applied through terminals 51 and 52 to an amplifier 53, in which they are combined. The output signals from this amplifier represent the east-west ground speed ($V_{E-W}$) of the aircraft and are applied to the primary winding of a transformer 54. The secondary winding of this transformer has a centre tapping which is earthed so that signals of equal amplitude but of opposite phase are applied, by way of conductors 55 and 56, to the diametrically opposite points 49 and 50 (Fig. 3) of the potentiometer 43. Alternating voltages having maximum amplitudes proportional to the north-south air speed of the simulation aircraft and the north-south wind velocity are applied through terminals 57 and 58 to an amplifier 59, in which they are combined. The output signals from this amplifier 59 represent the north-south ground speed ($V_{N-S}$) of the aircraft and are applied to the primary winding of a transformer 60. The secondary winding of this transformer has a centre tapping which is earthed so that signals of equal amplitude but of opposite phase are applied, by way of conductors 61 and 62, to diametrically opposite points on the potentiometer 40 which correspond to the points 49 and 50 (Fig. 3) of the potentiometer 43.

It will be seen that the alternating signals obtained by the wipers 44 and 45 of the potentiometer 43 correspond to $-V_{E-W} \sin a$ and $V_{E-W} \cos a$ whilst the alternating signals obtained by the wipers 41 and 42 of the potentiometer 40 correspond to $V_{N-S} \sin a$ and $V_{N-S} \cos a$. The signals of $V_{N-S} \cos a$ and $-V_{E-W} \sin a$ represent components of the velocity of the aircraft in the vertical direction of the chart and are applied to the amplifier 15 which determines the energisation of the motor 14 for driving the vertical lead-screw 13. The signals $V_{E-W} \cos a$ and $V_{N-S} \sin a$ represent components of the velocity of the aircraft in the horizontal direction of the chart and are applied to the amplifier 21 which serves to determine the energisation of the motor 20 driving the horizontal lead-screw 18.

From the preceding description with reference to Figs. 1, 2 and 3 it will be seen how the recording pen 12 is caused to move over the chart 10 in a manner such that, when the simulation aircraft is flown by a pupil on a constant magnetic compass course, said pen will cut the meridians of the chart at substantially constant angles. The signals representing the north-south and east-west speeds of the aircraft are corrected automatically, without the need for any action by a pupil "flying" the simulation aircraft, to take into account the variation, from point to point on the chart, of the angle made by a reference bearing (e. g. north) with the axes of the lead-screws. As the scale of straight meridian conic charts is substantially constant the course plotted on the chart by the pen is reasonably accurate.

There is shown in Fig. 4, an apparatus, according to another embodiment of the invention, for computing the signals required to drive the vertical and horizontal lead-screws so that the pen will move over a straight meridian conic chart in accordance with the headings indicated by the azimuth system of the navigational trainer. The operation of this further apparatus will first be explained with reference to Fig. 5, in which the meridians of a straight meridian conic chart are represented by the straight lines 7 and the parallels of latitude by the concentric arcs 8, the pole-point of the projection being indicated at P. A reference point Q is chosen having polar co-ordinates $R_0$, $a_0$, where $R_0$ is the distance of the reference point from point P, and $a_0$ is the angle made by the meridian passing through the reference point with a meridan OP parallel to the vertical sides of the chart frame. As illustrated, the angle $a_0$ is zero. The position of the "aircraft" is represented at points having polar co-ordinates R, a. The heading of the aircraft is shown by the angle b, and its ground speed is represented by the vector V, which can be resolved into a north-south component V cos b in the direction of the meridian passing through S and an east-west component V sin b in a direction at right-angles to the meridian passing through S.

From this it will be seen that:

$$\frac{dR}{dt} = V \cos b, \frac{da}{dt} = \frac{V \sin b}{R}$$

and that $$R_0 - R = V \cos b \, dt, a_0 - a = \frac{V \sin b}{R} dt$$

Furthermore, it will be apparent that $y = R_0 - R \cos a$ and $x = R \sin a$, where x and y are the Cartesian co-ordinates of point S with respect to rectangular axes having as their origin the point $(R_0, a_0)$ and one of which of said axes lies along OP.

The apparatus shown in Fig. 4 serves to solve the above equations and to impart to vertical and horizontal lead-screws the rotations necessary to move an associated recording pen in a manner such that, when the simulation aircraft is being "flown" on a constant magnetic compass course the said pen will cut the meridians of an associated straight meridian conic chart at substantially constant angles.

A rotor winding 63 of a teletorque transmitter is coupled mechanically with the indicator of a magnetic compass system (not shown) whereby a pupil who is "flying" the simulation aircraft ascertains the heading angle of the said craft. In this way, any variation of the heading of the aircraft will result in a corresponding angular rotation of this rotor winding 63. An alternating voltage of constant maximum amplitude is applied between a terminal 64 and earth, to energise this rotor winding 63, and associated stator winding 65 is connected electrically to the stator winding 66 of a remotely situated teletorque receiver. A rotor winding 67 of the latter has one of its ends earthed and the other end thereof is connected to provide the input for an amplifier 68. This amplifier forms part of a follow-up servo-system comprising also an electric motor 69 which, when energised by the output from said amplifier, serves to drive the said rotary winding 67. This arrangement is such that when the heading angle of the aircraft is changed the consequent and corresponding angular rotation of the rotor winding 63 results in alternating signals being induced in the rotor winding 67 and these signals, after amplification by the amplifier 68, are used to energise the motor 69 for driving the said rotor winding 67 until it reaches a position for which there is no signal induced therein. The motor 69 also drives a generator 70 which serves to provide velocity feedback signals for the amplifier 68.

In addition the motor 69 is adapted to drive the rotor winding 71 of a sine-cosine resolver so that it receives angular movements corresponding to those of the rotor winding 63 and its angular position corresponds to the bearing of the aircraft. This rotor winding 71 is energised by applying, between a terminal 72 and earth, an alternating electric signal having an amplitude V which is proportional to the ground speed of the aircraft and therefore the signals induced into the mutually-perpendicular stator windings 73 and 74 of this resolver are equal to V cos b and V sin b respectively.

The quantity V cos b represents the rate of increase of R and constitutes the input for an amplifier 75 of an integration system pertaining to R. This integration system comprises an electric motor 76, which is adapted to be energised by the output from this amplifier 75, and the shaft of this motor is given an initial rotation corresponding to the value of $R_0$. This system performs a time integration of the input voltage to the amplifier 75.

The motor 76, in addition to driving a generator 77 for obtaining velocity feedback signals for the amplifier 75, drives the wipers 78 and 79 of drum-type potentiometers 80 and 81 respectively. The potentiometer 80 is connected in series with the stator winding 74 of the resolver and receives therefrom an input signal which represents V sin b. Furthermore, said potentiometer 80 has a winding of such form that the output obtained by its wiper 78 is proportional to the reciprocal of the angular rotation of the wiper, this angular rotation being proportional to the instantaneous value of R which is computed by the motor 76. The output from the wiper 78 therefore corresponds to the quantity V sin b/R, that is to say the rate of change of angle a. The output obtained by the wiper 78 constitutes an input signal for an amplifier 82 of an integration system pertaining to a. This system comprises an electric motor 83, the shaft of which is given an initial rotation corresponding to the angle $a_0$ and this motor is adapted to be energised by the output from the amplifier 82 so as to determine continuously the angle a. The motor 83 drives a generator 84, which provides velocity feedback for the amplifier 82, and also the wipers of two drum-type potentiometers 85 and 86.

The potentiometer 81 has an alternating voltage of constant maximum amplitude applied across it and its winding has such form that the wiper 79 thereof provides an output signal representing the instantaneous value of R, for application to the windings of the two potentiometers 85 and 86. The windings of the latter have such form that the wipers thereof provide output signals porportional to the sine and cosine respectively of a, these signals thus representing R cos a and R sin a.

The signals representing R sin a are applied to an amplifier 87 of a servo system comprising an electric motor 88, which is adapted to be energised by the output from said amplifier 87, to drive a generator 89, which provides velocity feedback for the amplifier 87, and to drive the wiper of an "answer" potentiometer 90. The motor 88 also drives a horizontal lead-screw 91 which is arranged in association with a frame 92 adapted to carry the chart which is being used for the apparatus. The signals obtained by the wiper of the potentiometer 90 are applied to the input of the amplifier 87 and those signals are such that the motor 88 rotates until the output obtained by means of this wiper is equal and opposite to the R sin a signal. Accordingly, the rotation of the horizontal lead-screw 91 is proportional to R sin a and corresponds to the displacement x of S on the chart (see Fig. 5).

The signals obtained by the wiper of the potentiometer 85, representing R cos a, constitute an input for an amplifier 93 of a servo system comprising an electric motor 94 which is adapted to be energised by the output from said amplifier 93. This motor, 94, drives a generator 95, which provides velocity feedback for the amplifier 93, the wiper of an "answer" potentiometer 96 and a vertical lead-screw 97 which has mounted thereon a recording pen 98. The amplifier 93 has a further signal input which is obtained from the wiper of a potentiometer 99 across which there is applied an alternating voltage of constant maximum amplitude and in phase opposition to the alternating voltage, representing $R \cos a$, which the amplifier receives from the potentiometer 85, and the wiper of this potentiometer is pre-set to provide a value $R_0$. The wiper of the potentiometer 96 provides a signal which is applied to the input of the amplifier 93 so that the motor 94 will continue to operate until the signal obtained by this wiper has an amplitude equal and opposite to the resultant of the other input voltages. Accordingly, the vertical lead-screw 97 receives a rotation which is proportional to $(R_0 - R \cos a)$ and which corresponds to the $y$ co-ordinate on the chart (see Fig. 5).

The horizontal lead-screw 91 and the vertical lead-screw 97 are initially set so that the pen 98 is at the point $R_0$, $a_0$ and from the foregoing description it will be apparent that the pen 98 thereafter will be moved horizontally and vertically over the chart in accordance with the component of the ground speed of the aircraft in the horizontal and vertical directions on the chart.

It may be desired to use a chart based on a polar projection in which the scale factors along the meridian and parallel at any point may be different and furthermore may vary from point to point. In this case, the rotations to be given to the lead-screws must be controlled in accordance with the scale factors prevailing at the point on the chart at which the aircraft is situated. In polar projections both the radial and transverse scales at any point, that is to say the scale along the meridian and the scale along the parallel at that point, are functions of R, the distance of the point in question from the pole. To meet these requirements the connections between the resolver and the R integration system of Fig. 4 can be modified as shown in Fig. 6. In this modification the potentiometer 80, to which the input signal $V \sin b$ is applied, is modified in shape so as to give an output of $V \sin b / F_1(R)$ when its wiper is displaced through an angle corresponding to R, where $F_1(R)$ is the expression for the scale factor along the parallel of latitude at a distance R from the pole. The stator coil 73 of the resolver, providing an output voltage $V \cos b$, is connected in series with an additional potentiometer 100 instead of being directly connected to the input of the amplifier 75 as shown in Fig. 5. The wiper of this potentiometer 100 is connected to the input of the amplifier 75 and its winding is contoured so as to give an output of $V \cos b / F_2(R)$ when its wiper is rotated through an angle corresponding to R, where $F_2(R)$ is the expression for the scale factor along a meridian at a distance R from the pole.

The $a$ integrator system is exactly the same as that shown in Figure 4, consisting of the amplifier 82, the generator 83 and the motor 84, which drives the wipers of the contoured potentiometers 85 and 86. The input signal for the amplifier 82 is derived from the modified potentiometer 80; the output of the potentiometer 81 is applied across the potentiometers 85 and 86, and the signals from these latter are used to drive the lead-screw motors 94 and 88.

The R integrator system therefore continuously determines R, taking into account the varying scale factor along the meridians of the chart, and the $a$ integrator system continuously determines $a$, taking into account the variation of scale factor along the parallels as the distance from the pole is altered.

What we claim is:

1. Navigational training apparatus for automatically indicating the assumed course of a simulation craft on and in relation to the coordinates of a straight-meridian conic chart, comprising an indicating element associated with said chart, translating means operatively connected to said indicating element and to said chart and operable to obtain relative movement of said element and said chart, a source of data representative of the assumed movement of said craft, a computing system controlled by said data, said computing system including a first computing means adapted to derive data representative of the angle made at the pole point on which the projection of said chart is based between a reference meridian and the meridian passing through the point on the chart indicated by said element, a second computing means connected to said first computing means and responsive to said derived data and adapted to produce further data representative of components of the assumed movement of said craft, and operating means controlled by said further data and connected to said translating means to cause operation of said translating means.

2. Navigational training apparatus for automatically indicating the assumed course of a simulation craft on and in relation to the coordinates of a straight-meridian conic chart, comprising an indicating element associated with said chart, translating means operatively connected to said indicating element and to said chart and operable to obtain relative movement of said element and said chart in two normal directions, a source of data representative of the assumed movement of said craft, computing means controlled by said data and adapted to derive data representative of the angle made at the pole point on which the projection of said chart is based between a reference meridian lying in one of said two normal directions and the meridian passing through the point on the chart indicated by said element, means associated with said computing means and serving to provide data representative of the distance of said indicated point from said pole point, resolving means controlled by said derived data and adapted to resolve said distance data into further data representative of the Cartesian coordinates of the position of said craft as indicated on said chart with respect to axes parallel to said two normal directions, and operating means controlled by said further data and connected to said translating means to cause operation of said translating means.

3. Navigational training apparatus for automatically indicating the assumed course of a simulation craft on and in relation to the coordinates of a straight-meridian conic chart, comprising an indicating element associated with said chart, translating means operatively connected to said indicating element and to said chart and operable to obtain relative movement of said element and said chart in two normal directions, a source of voltage signals representative of the assumed velocity of said craft, computing means controlled by said voltage signals and adapted to derive data representative of the angle made at the pole point on which the projection of said chart is based between a reference meridian lying in one of said two normal directions and the meridian passing through the point on the chart indicated by said element, means associated with said computing means and serving to provide a voltage signal representative of the distance of said indicated point from said pole point, resolving means controlled by said derived data and adapted to resolve said distance voltage signal into resultant voltages representative of the Cartesian coordinates of the position of said craft on said chart with respect to axes parallel to said two normal directions, and operating means controlled by said resultant voltages and connected to said translating means to cause operation of said translating means.

4. Navigational training apparatus for automatically indicating the assumed course of a simulating craft on and in relation to the coordinates of a straight-meridian conic chart, comprising an indicating element associated with said chart, translating means operatively connected to said indicating element and to said chart and operable to obtain relative movement of said element and said chart in two normal directions, a source of data representative of the assumed movement of said craft, computing means operable in response to operation of said translating means and adapted to derive data representative of the angle made at the pole point on which the projection of said chart is based between a reference meridian lying in one of said two normal directions and the meridian passing through the point on the chart indicated by said element, resolving means controlled by said derived data and adapted to resolve said movement data into further data representative of the Cartesian coorinates of the movement of said craft as indicated on said chart with respect to axes parallel to said two normal directions, and operating means controlled by said further data and conneced to said translating means to cause operation of said translating means.

5. Navigational training apparatus for automatically indicating the assumed course of a simulation craft on and in relation to the coordinates of a straight-meridian conic chart, comprising an indicating element associated with said chart, translating means operatively connected to said indicating element and to said chart and operable to obtain relative movement of said element and said chart in two normal directions, a source of voltage signals representative of the assumed velocity of said craft, computing means operable in response to operation of said translating means and adapted to derive data representative of the angle made at the pole point on which the projection of said chart is based between a reference meridian lying in one of said two normal directions and the meridian passing through the point of the chart indicated by said element, resolving means controlled by said derived data and adapted to resolve said voltage signals into resultant voltages representative of the Cartesian coordinates of the velocity of said craft as indicated on said chart with respect to axes parallel to said two normal directions, and operating means controlled by said resultant voltages and connected to said translating means to cause operation of said translating means.

6. Apparatus as claimed in claim 5, in which said computing means includes means controlled by electric potential differences which are representative of the coordinates of said element with respect to perpendicular reference axes having as origin the pole of the projection on which said chart is based, said means serving to compute said data representative of said angle.

7. Apparatus as claimed in claim 6, in which the means serving to compute said angle includes a magnetic resolver having two perpendicular stator coils to which said potential differences are respectively applied, and a null servo unit to which the rotor coil of the resolver is connected, whereby the servo unit tends to rotate the rotor coil to an angular position representative of the said angle.

8. Apparatus as claimed in claim 5, in which said computing means includes means serving to establish electric potential differences which are representative of the coordinates of said element with respect to pre-determined mutually perpendicular reference axes, and manually adjustable means serving to establish electric potential differences which are representative of the coordinates of the pole of the projection of which said chart is based with respect to the said predetermined axes, whereby charts of different regions and on different scales can be used.

9. A device for use with navigational course indicating apparatus of the kind including an indicating element and translating means for obtaining relative movement of said element and a chart for enabling the apparatus to indicate the assumed course of a simulation craft on and in relation to the coordinates of a straight-meridian conic chart, said device comprising a computing system responsive to electric signals representative of the assumed movement of a craft the course of which is to be indicated, the said computing system including a first computing means adapted to derive data representative of the angle made at the pole point on which the projection of said chart is based between a reference meridian and the meridian passing through the point on the chart indicated by said element, and a second computing means connected to said first computing means and responsive to said derived data and adapted to produce further data representative of components of the assumed movement of said craft, and operating means controlled by said further data and connected to said translating means to cause operation of said translating means.

10. Navigational training apparatus for indicating the course of a simulation craft on a polar chart on which the scale factor along the meridian at any point is a first function of the distance of the point on the chart representing the position of said craft from the pole of the projection on which said chart is based, and the scale factor along the parallel at said point is a second function of said distance, including an indicating element, translating means for obtaining relative movement of said element and said chart in two normal directions, means for deriving data representing the east-west and north-south movement of the craft, means controlled by said data for computing said distance, means controlled in accordance with said distance for modifying said data in accordance with said respective scale factors, means controlled in accordance with said distance and said modified data for providing output data representing the angle made by one of said two normal directions with the meridian passing through the point on said chart representing the position of said craft, means controlled in accordance with said angle-representing data for resolving said modified data along heading axes parallel to said two normal directions at said point on said chart, to provide signals representing the components of velocity of the craft along said axes, and means responsive to said latter signals for operating said translating means.

11. In flight training apparatus, electrical means for obtaining voltages representing velocity components of flight on a pair of mutually perpendicular axes; plotting equipment including a pair of integrating motors, tracing arms controlled by the motors and a tracing pen positionable by said tracing arms; resolving means interconnecting said electrical means and integrator motors for deriving control voltages to operate the plotting equipment; means operatively connected with said plotting equipment and said resolving means for computing the instant angle of meridian tilt on a chart according to the flight position and controlling said resolving means in accordance with such angle to cause the plotting equipment to trace out the flight path on said chart.

References Cited in the file of this patent

UNITED STATES PATENTS

| | | |
|---|---|---|
| 2,393,474 | Jones | Jan. 22, 1946 |
| 2,443,604 | Dehmel | June 22, 1948 |
| 2,471,315 | Dehmel | May 24, 1949 |
| 2,569,328 | Omberg | Sept. 25, 1951 |
| 2,714,047 | Dehmel | July 26, 1955 |